United States Patent
Lim et al.

(10) Patent No.: US 8,300,621 B2
(45) Date of Patent: Oct. 30, 2012

(54) SYSTEM AND METHOD FOR TIMING ACQUISITION AND CARRIER FREQUENCY OFFSET ESTIMATION IN WIRELESS COMMUNICATION BASED ON OFDM

(75) Inventors: Hyoung-Soo Lim, Daejeon (KR); Dong-Seung Kwon, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom, Inc. (KR)

( * ) Notice: Subject to any disclaimer, the term of this patent is extended or adjusted under 35 U.S.C. 154(b) by 1385 days.

(21) Appl. No.: 11/521,171

(22) Filed: Sep. 14, 2006

(65) Prior Publication Data

US 2007/0140104 A1 Jun. 21, 2007

(30) Foreign Application Priority Data

Sep. 14, 2005 (KR) .................. 10-2005-0085695

(51) Int. Cl.
  *H04J 3/06* (2006.01)
(52) U.S. Cl. ........ 370/350; 370/208; 370/319; 370/330; 370/343; 370/436; 370/478; 370/480; 370/503; 455/13.2; 455/60; 455/112; 455/208; 455/216; 455/502; 377/54; 377/64; 365/78; 365/80; 365/189.12; 380/265
(58) Field of Classification Search .................. 370/281, 370/319, 208, 210, 295, 324, 330, 343, 344, 370/350, 436, 478, 480, 481, 503–520; 455/42, 455/13.2, 59, 60, 112, 208, 209, 216, 265, 455/324, 502, 503; 375/145, 149, 240.28, 375/260–267, 293, 294, 354–376; 377/54, 377/64–81; 365/78, 80–93, 189.12; 380/265
See application file for complete search history.

(56) References Cited

U.S. PATENT DOCUMENTS 5,812,523 A * 9/1998 Isaksson et al. .............. 370/208
(Continued)

FOREIGN PATENT DOCUMENTS

JP 2000-068973 3/2000
(Continued)

OTHER PUBLICATIONS

Kwon et al., Preamble Structure for Single Frequency Cellular Systems Using Orthogonal Frequency Division Multiplexing, IEEE Transactions on Consumer Electronics, vol. 50, No. 1, Feb. 2004, pp. 115-118.

*Primary Examiner* — Hoon J Chung
(74) *Attorney, Agent, or Firm* — The Farrell Law Firm, P.C.

(57) ABSTRACT

The present invention relates to a method for timing acquisition and carrier frequency offset estimation of an OFDM communication system and an apparatus using the same.
For this purpose the present invention provides a method for calculating at least one auto-correlation and calculating an observation value by performing a sliding sum on the at least one auto-correlation, and calculating a peak point of an absolute value of the observation as frame timing.
In addition, the present invention provides a method for generating a third OFDM symbol that is generated by delaying a second OFDM symbol, calculating an observation value through the second and third OFDM symbols, and calculating a phase difference from a result of multiplication of the observation value and a conjugate complex value of the observation value such that a carrier frequency offset can be estimated.
According to the present invention, the number of OFDM symbols is sufficient for obtaining timing acquisition with high reliability, and the offset estimation algorithm having a lower implementation complexity is provided such that superior performance is expected and carrier frequency offset with high reliability can be achieved.

13 Claims, 10 Drawing Sheets

U.S. PATENT DOCUMENTS

| | | | |
|---|---|---|---|
| 7,227,834 B1* | 6/2007 | Barton et al. | 370/208 |
| 7,266,164 B2* | 9/2007 | Jeon et al. | 375/340 |
| 7,346,135 B1* | 3/2008 | Narasimhan | 375/346 |
| 2002/0181509 A1* | 12/2002 | Mody et al. | 370/480 |
| 2004/0228272 A1* | 11/2004 | Hasegawa et al. | 370/210 |
| 2005/0063298 A1* | 3/2005 | Ling et al. | 370/208 |
| 2005/0100118 A1* | 5/2005 | Zhang | 375/343 |
| 2005/0107969 A1* | 5/2005 | Jitsukawa et al. | 702/77 |
| 2005/0147079 A1* | 7/2005 | Lakkis | 370/350 |
| 2005/0163238 A1* | 7/2005 | Fujii | 375/260 |
| 2005/0281290 A1* | 12/2005 | Khandekar et al. | 370/500 |
| 2006/0109809 A1* | 5/2006 | Kao et al. | 370/328 |
| 2006/0215538 A1* | 9/2006 | Murthy et al. | 370/208 |
| 2007/0075709 A1* | 4/2007 | Chung et al. | 324/500 |
| 2007/0086329 A1* | 4/2007 | Glazko et al. | 370/208 |
| 2007/0147336 A1* | 6/2007 | Lee et al. | 370/350 |
| 2007/0230591 A1* | 10/2007 | Choi et al. | 375/260 |
| 2008/0212563 A1* | 9/2008 | Birru | 370/350 |

FOREIGN PATENT DOCUMENTS

| | | |
|---|---|---|
| JP | 2000-341244 | 12/2000 |
| KR | 10-2000-0047732 | 7/2000 |
| KR | 10-2001-0002477 | 1/2001 |
| KR | 2001-0007391 | 1/2001 |
| KR | 2001-0105898 | 11/2001 |
| KR | 2003-0016121 | 2/2003 |
| KR | 2005-0051832 | 6/2005 |
| KR | 2005-0066562 | 6/2005 |
| WO | WO 00/77961 A1 * | 12/2000 |

* cited by examiner

SYSTEM AND METHOD FOR TIMING ACQUISITION AND CARRIER FREQUENCY OFFSET ESTIMATION IN WIRELESS COMMUNICATION BASED ON OFDM

CROSS-REFERENCE TO RELATED APPLICATION

This application claims priority to and the benefit of Korean Patent Application No. 10-2005-0085695 filed in the Korean Intellectual Property Office on Sep. 14, 2005, the entire contents of which are incorporated herein by reference.

BACKGROUND OF THE INVENTION (a) Field of the Invention

The present invention relates to a method of timing acquisition and carrier frequency offset estimation for an orthogonal frequency division multiplexing (OFDM)-based communication system. Particularly, the present invention relates to an apparatus for acquiring OFDM symbol timing and estimating a carrier frequency offset by applying a conjugate complex symmetric OFDM symbol in a time domain to a timing acquisition and frequency offset estimation algorithm in an OFDM-based communication system, and a method thereof.

(b) Description of the Related Art

A fourth mobile communication system that requires data transmission of large capacity, such as a wireless local area network (WLAN), wireless broadcasting, or digital multimedia broadcasting (DMB) employs an orthogonal frequency division multiplexing (OFDM) technique for transmission of wideband high-speed data. The OFDM technique is a multi-carrier transmission technique that divides a range of available bandwidth spectrum into a plurality of subcarriers. According to the OFDM technique, a series of input data rows are converted to N parallel data rows, each being transmitted in the divided subcarrier.

FIG. 1 shows a structure of a frame used for data transmission in an OFDM-based mobile communication system.

Data transmitted in the OFDM-based mobile communication system is formed of a preamble and data symbols that contain subsequent data.

The preamble includes information on frame synchronization, cell search, time/frequency synchronization, and channel estimation. The preamble is typically located at a start point of every frame, but it may be located in a middle portion or at an end portion of each frame.

FIGs. 2-1 and 2B show exemplary preamble sequence allocation when each cell transmits data by using a different subcarrier in an OFDM system.

FIG. 2A exemplarily shows segments used by the respective cells in IEEE 802.16, and there are three types of segments: segment a, segment b, and segment c.

FIG. 2-2 shows a subcarrier in which a preamble is used in the cell structure of FIG. 2-1.

As shown in FIG. 2-2, a signal transmitted from a base station is formed by binary phase shift keying (BPSK) modulation of a preamble pattern that is allocated to the corresponding cell or segment of a subcarrier arranged in an interval of three subcarriers in a frequency domain.

Each cell can have a maximum of three segments, and arrangement of available subcarriers in each of the three subcarriers may have a different offset in accordance with a segment ID.

That is, a subcarrier index in cells (e.g., Cell 0, Cell 2, Cell 4, Cell 6) with segment ID of a is a multiple of 3 starting from 0 (i.e., 0, 3, 6, 9, . . . ), a subcarrier index in cells (e.g., Cell 1) with segment ID of b is a multiple of 3+1 starting from 1 (i.e., 1, 4, 7, 10, . . . ), and a subcarrier index in cells (e.g., Cell 3 and Cell 5) with segment ID of c is a multiple of 3+2 starting from 2 (i.e., 2, 5, 8, 11, . . . ), and the subcarriers are used for preamble pattern transmission.

Therefore, a preamble signal of each segment has the same pattern repeated three times during a single OFDM symbol period in a time domain. In this case, the respective repeating patterns have a phase rotation of $\pm 2\pi/3$ therebetween in accordance with an arrangement of available subcarriers. By using characteristics of this repetition, an absolute value of auto-correlation having a time interval of a ⅓ OFDM symbol period for a received signal can be observed such that the presence of a preamble can be easily detected, and at the same time, timing acquisition for the preamble can be achieved. In addition, a carrier frequency offset can be estimated within a $\pm \frac{1}{2}$ range of a frequency difference between subcarriers by observing a mean phase difference between the repeating patterns.

When estimating a carrier frequency offset, an algorithm that uses a cyclic prefix (CP) for data symbols transmitted after the preamble can be applied. However, a signal received at a terminal located at an area where three different segment signals, each having different segment IDs, can be received, does not have the repeating pattern of the time domain since all available subcarriers of the signal are modulated. Therefore, a conventional algorithm cannot achieve appropriate performance in frame timing acquisition and carrier frequency offset estimation.

In order to solve the above-stated problem, Korean Patent No. 10-2001-0050104 (entitled "Method for creating Symmetric-Identical preamble and method for synchronizing symbol and frequency of Orthogonal Frequency Division Multiplexed signals by using the Symmetric-Identical preamble") has disclosed a method for symbol timing and frequency synchronization for an OFDM signal by using a symmetric-identical preamble. In addition, Korean Patent No.10-2003-0097867 (entitled "Method for embodying frame preamble in wireless communication based on OFDM, and method for acquiring frame synchronization and searching cells using the preamble") has disclosed a method for frame synchronization and cell searching by providing an initial synchronization algorithm with a new preamble structure, and Korean Patent No. 10-2000-0032951 (entitled "Optimized synchronization preamble structure") has disclosed a specific preamble pattern with optimized PAPR and correlation characteristics. However, since the respective three prior arts use a preamble in a specific structure or an independently designed preamble, the three prior arts still have a problem in frame timing acquisition and carrier frequency offset estimation by using a typical OFDM symbol.

In addition, a transaction (entitled "Preamble structure for single frequency cellular systems using orthogonal frequency division multiplexing") published in the IEEE Transactions on Consumer Electronics in Feb. 2004 proposes a novel preamble structure including frame synchronization acquisition, carrier frequency acquisition, and cell search. However, this transaction also provides a method using a novel preamble structure, and therefore it is difficult to achieve frame timing acquisition and carrier frequency offset by using this method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for acquiring frame timing of changed auto-correlation by using a complex conjugate symmetric OFDM symbol in a time domain and estimating a carrier frequency offset from a phase relationship between changed auto-correlation in an OFDM symbol period, a CP, and changed auto-correlation calculated through a portion before the OFDM symbol period.

An apparatus for acquiring frame timing according to an exemplary embodiment of the present invention is provided to acquire frame timing by using an OFDM symbol in a terminal of an OFDM-based communication system. The frame timing acquisition apparatus includes a delay signal generator, an operation unit, and a peak value checking unit. The delay signal generator stores the input OFDM symbol and a second OFDM symbol generated by delaying the input OFDM symbol. The operation unit calculates an observation value resulting from auto-correlation of the OFDM symbol and the second OFDM symbol. The peak value checking unit calculates the frame timing by checking a peak point of an absolute value of the observation value.

A method for calculating frame timing according to another exemplary embodiment of the present invention calculates frame timing by using an OFDM symbol input to a terminal of an OFDM system. The method includes: (a) receiving at least one OFDM symbol from a base station; (b) generating a second OFDM symbol by delaying the received OFDM symbol; (c) calculating at least one auto-correlation by operating the OFDM symbol and the second OFDM symbol; and (d) outputting a peak point of an absolute value of an observation value resulting from the at least one auto-correlation as the frame timing.

An apparatus for estimating a carrier frequency offset according to another exemplary embodiment of the present invention is provided to estimate the carrier frequency offset by using an OFDM symbol in an OFDM communication system. The apparatus includes a delay signal generator, a first operation unit, a second operation unit, and an offset estimating unit. The delay signal generator stores the OFDM symbol, a second OFDM symbol generated by delaying the OFDM symbol, and a third OFDM symbol generated by delaying the second OFDM symbol. The first operation unit calculates a first observation value resulting from a first auto-correlation of the first OFDM symbol and the second OFDM symbol. The second operation unit calculates a second observation value resulting from a second auto-correlation of the second OFDM symbol and the third OFDM symbol. The offset estimating unit estimates the carrier frequency offset by calculating a phase difference between the first observation value and the second observation value after calculating a conjugate complex value of the second observation value.

A method for estimating a carrier frequency offset according to an exemplary embodiment of the present invention estimates the carrier frequency offset by using an OFDM symbol in an OFDM communication system with the presence of a carrier frequency offset. The method includes: (a) receiving at least one OFDM symbol from a base station; (b) generating a second OFDM symbol by delaying the OFDM symbol and generating a third OFDM symbol by delaying the second OFDM symbol; (c) calculating a first auto-correlation by using the OFDM symbol and the second OFDM symbol, calculating a first observation value resulting from the auto-correlation, calculating a second auto-correlation by using the second OFDM symbol and the third OFDM symbol, and calculating a second observation value resulting from the second auto-correlation; and (d) calculating a phase difference through the first observation value and the second observation value and estimating the carrier frequency offset.

BRIEF DESCRIPTION OF THE DRAWINGS

FIGS. 2-1 and 2-2 exemplarily show preamble sequence allocation when each cell transmits data by using a different subcarrier in an OFDM system.

DETAILED DESCRIPTION OF THE EMBODIMENTS

Figure 1:
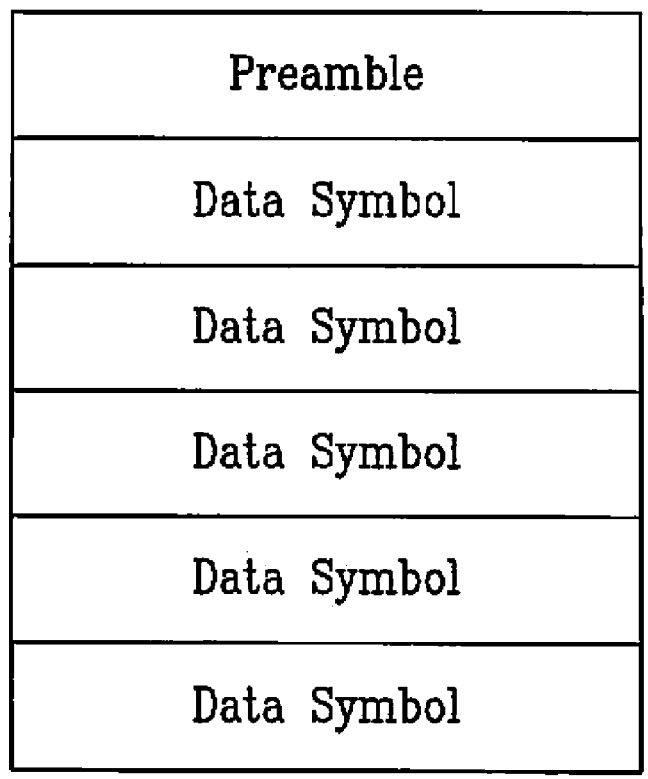
FIG. 1 is a structure of a frame used for data transmission/receiving in an OFDM-based mobile communication system.
Figure 1:
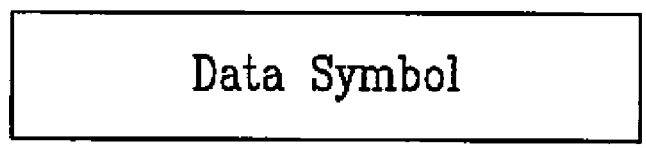
Figures 1, 2:
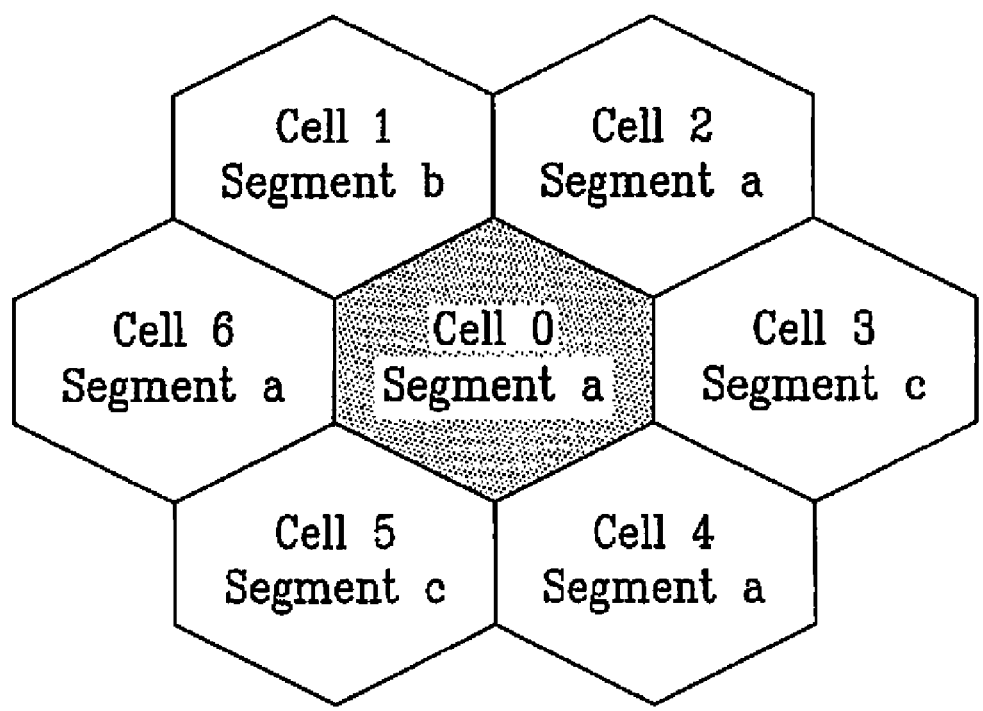
Figure 2:
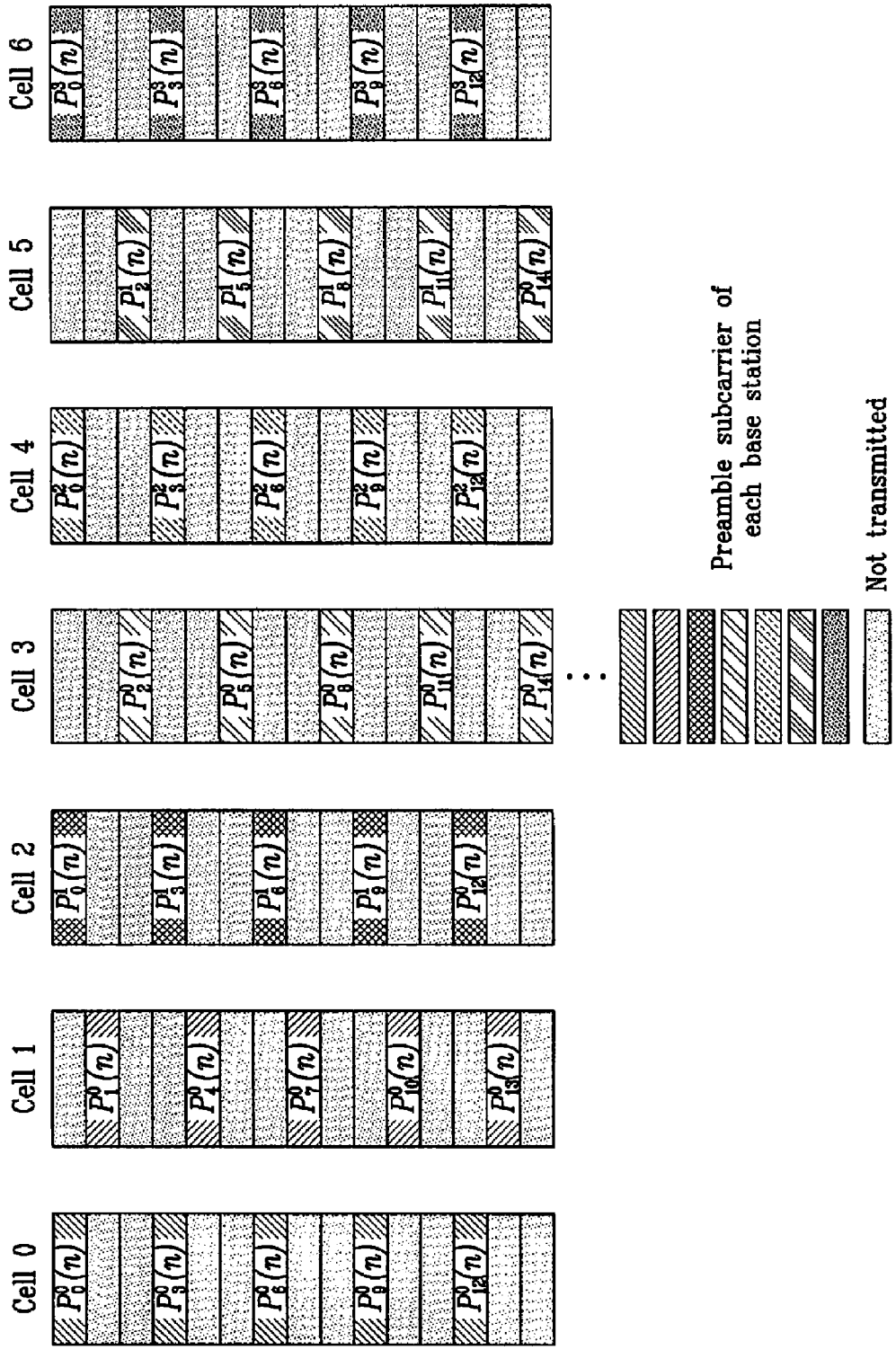

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise/include" or variations such as "comprises/includes" or "comprising/including" will be understood to imply the inclusion of stated elements but not the exclusion of any other elements.

In addition, throughout this specification and the claims which follow, a module means a unit that performs a specific function or operation, and can be realized by hardware or software, or a combination of both.

Figure 3:
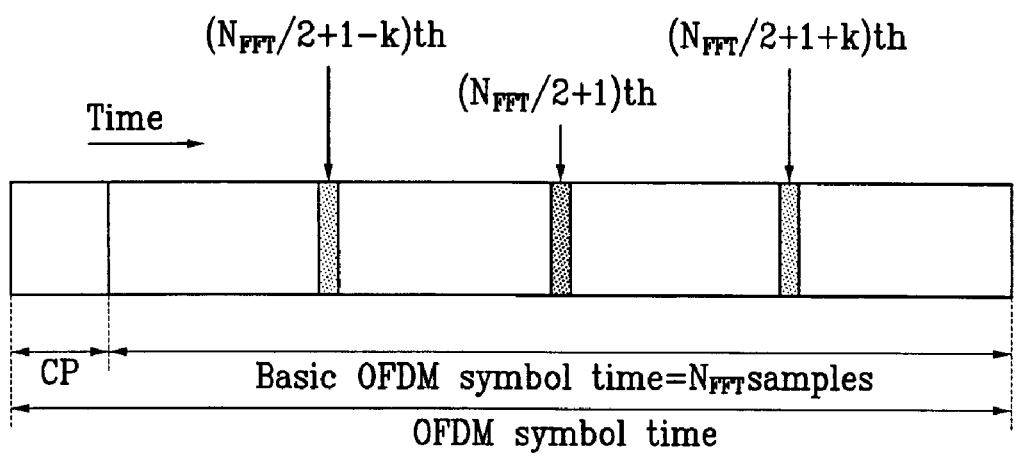
FIG. 3 shows a conjugate complex symmetric OFDM symbol in a time domain.

FIG. 3 shows a conjugate complex symmetric OFDM symbol in a time domain.

A conjugate complex symmetric OFDM symbol is configured as shown in FIG. 3 when a carrier frequency offset is not taken into account. That is, centering on the $(N_{FFT}/2+1)$-th OFDM symbol, a distance between the $(N_{FFT}/2+1-k)$-th OFDM symbol and the $(N_{FFT}/2+1)$-th OFDM symbol and a distance between the $(N_{FFT}/2+1+k)$-th OFDM symbol and the $(N_{FFT}/2+1)$-th OFDM symbol are identical.

Herein, the OFDM symbol may be a preamble symbol, or a data symbol of which all available subcarriers are modulated by antipodal modulation. In addition, $N_{FFT}$ denotes the size of an input or output vector used for generating an OFDM symbol, and k denotes a constant number that is less than $N_{FFT}/2$. That is, in the case that $N_{used}$ subcarriers are used for signal transmission, $k=-(N_{used}-1)/2, -(N_{used}+1)/2+1, \ldots, (N_{used}-1)/2$.

In this case, $N_{used}$ indicates the number of available subcarriers among subcarriers that can be generated by $N_{FFT}$. In general, subcarriers generated by $N_{FFT}$ are used for signal transmission, excluding some subcarriers in an edge portion and a subcarrier at a central portion among the subcarriers.

Accordingly, when the antipodal modulation is applied to all available subcarriers in a frequency domain, conjugate complex symmetric OFDM symbols are obtained in a time domain.

When a signal $A_k e^{j\theta}$ is carried on the k-th subcarrier (where $\theta$ denotes a constant number), a signal $\alpha_n$ of the time domain can be represented as given in $$a_n = \sum_{k=-(N_{used}-1)/2}^{k=(N_{used}-1)/2} A_k e^{j[2\pi(f_\theta + k\Delta f)t + \theta_0]}, \quad \text{[Equation 1]}$$

herein, $$n = 0, 1, \ldots, N_{FFT} - 1$$

where $A_k$ denotes a real number and $\Delta f$ denotes a frequency difference between subcarriers.

In addition, $\alpha_n$ is $\alpha_n = \alpha^*_{N_{FFT}-n}$. In this case, the feature of $n=1, 2, \ldots, N_{FFT}/2-1$ is also included.

By observing auto-correlation with the above features, timing acquisition for the corresponding OFDM symbol can be achieved.

Figure 4:
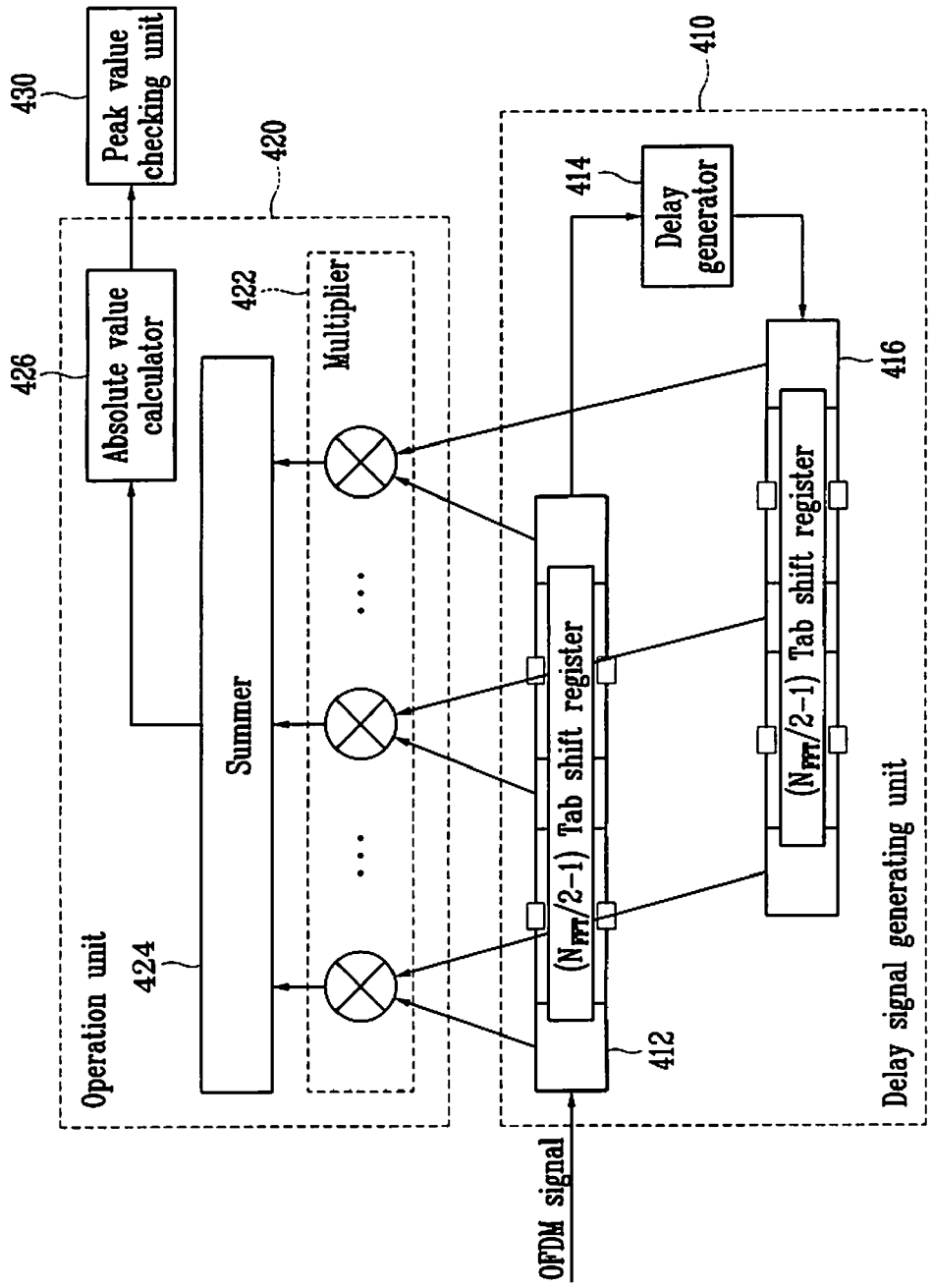
FIG. 4 is a block configuration of a timing acquisition algorithm using a conjugate complex symmetric OFDM symbol in a time domain according to an exemplary embodiment of the present invention.

FIG. 4 is a block diagram of a timing acquisition algorithm that uses a conjugate complex symmetric OFDM symbol in a time domain according to an exemplary embodiment of the present invention.

The timing acquisition algorithm according to the embodiment of the present invention includes a delay signal generator 410 that generates a delayed OFDM symbol (hereinafter, referred to as a second OFDM symbol) by delaying input of an OFDM symbol, an operation unit 420 for operating the input OFDM symbol and the second OFDM symbol generated by the delay signal generator 410, and a peak value checking unit 430 for checking a peak value in the operation result of the operation unit 420.

The delay signal generator 410 includes tab shift registers 412 and 416 and a delay generator 414.

The tab shift registers 412 and 416 input the input OFDM symbol to each tab and shift the symbol by one tab when another OFDM symbol is input. In the present invention, the tab shift registers 412 and 416 may be provided as an $N_{FFT}/2-1$ tab shift register that includes tabs to which $N_{FFT}/2-1$ samples can be input.

To achieve the timing acquisition according to the embodiment of the present invention, an observation value must be calculated. In order to calculate the observation value, a plurality of auto-correlations must be computed by using a sliding sum technique. In order to obtain the plurality of autocorrelations for the sliding sum, a conjugate complex multiplication must be performed on the current OFDM symbol and the second OFDM that is delayed by the length of a repeating pattern.

Accordingly, the delay generator 414 delays an OFDM symbol input to the tab shift register 412 by the length of the repeating pattern.

The OFDM symbol that is delayed by the delay generator 414 is input to the other shift register 416. In the following exemplary embodiments, the tab shift register 412 to which the OFDM symbol is directly input will be referred to as a first tab shift register, and the tab shift register 416 to which the second OFDM symbol delayed by the delay generator will be referred to as a second tab shift register. In this case, OFDM symbols input to the first shift register and the second shift register are conjugate complex symmetric.

When the OFDM symbol is input to the first tab shift register 412 and the second OFDM symbol is input the second tab shift register 416, an observation value is calculated through the operation unit 420. The operation unit 420 includes a multiplier 422, an adder 424, and an absolute value calculator 426.

The multiplier 422 multiples the OFDM symbol input to the first tab shift register 412 and the second OFDM symbol input to the second tab shift register 416 for acquisition of auto-correlation. Herein, the second OFDM symbol is delayed by the repeating pattern length. The timing acquisition algorithm includes a plurality of multipliers 422 in order to multiply the OFDM symbols respectively input to the respective tabs, Herein, it is preferred that the number of multipliers 422 corresponds to the number of tabs of the first and second tab shift registers 414 and 416.

The adder 424 performs a sliding sum on the auto-correlations calculated by the plurality of multipliers 422 and calculates an observation value.

When the observation value is calculated by the adder 424, the absolute value calculator 426 calculates an absolute value of the calculated observation value.

The peak value checking unit 430 checks a peak point of an absolute value of the observation value through the operation unit 420. In this case, the peak point checked by the peak value checking unit 430 indicates an end timing of the corresponding OFDM symbol period.

Figure 5:
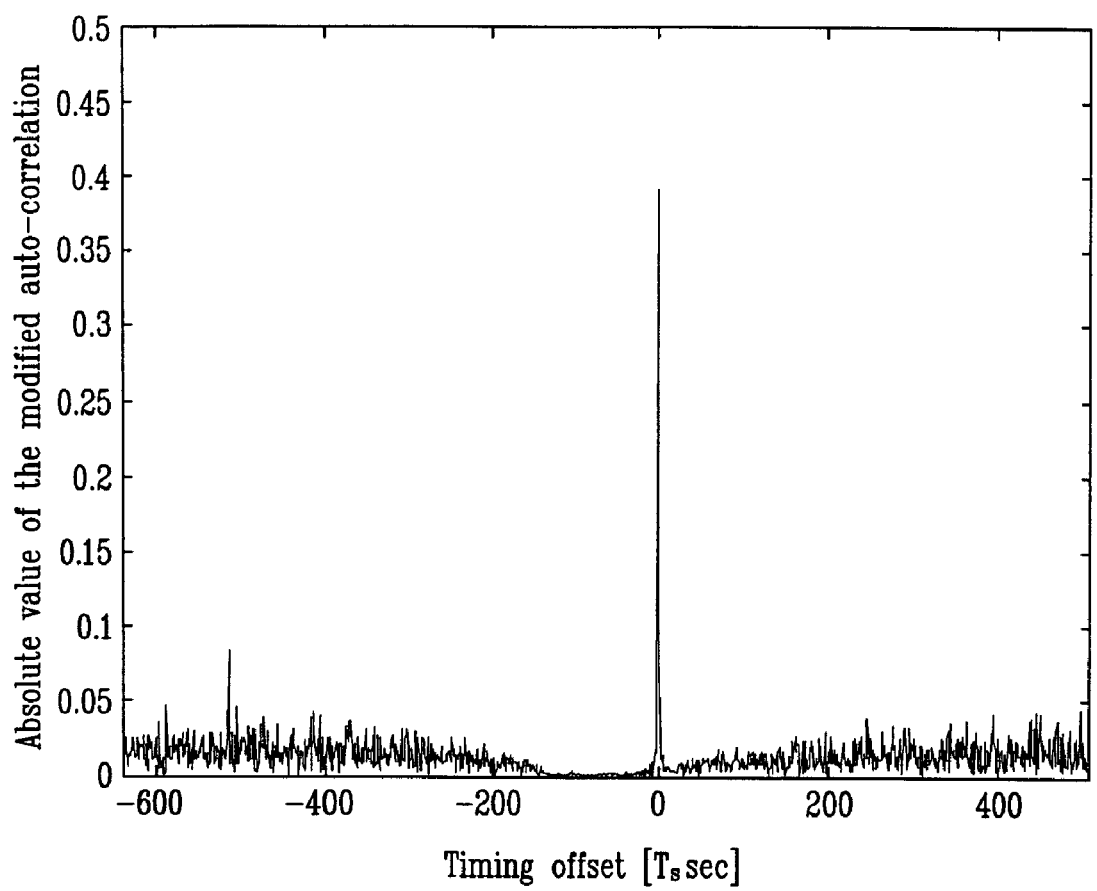
FIG. 5 is an exemplary graph showing characteristics of an absolute value of an observation value calculated through the timing acquisition algorithm according to the exemplary embodiment of the present invention.

FIG. 5 is an exemplary graph showing absolute value characteristics of the observation value calculated through the timing acquisition algorithm according to the exemplary embodiment of the present invention.

The graph of FIG. 5 shows the absolute value of the observation value calculated by the absolute value calculator 426. In the graph of FIG. 5, assume that an additive white Gaussian noise (AWGN) channel is used, 400 subcarriers at left and right portions among 1024 subcarriers, excluding subcarriers that correspond to a centering frequency among the 1024 subcarriers, are used for signal transmission, and the length of a cyclic prefix (CP) corresponds to ⅛ of an OFDM symbol length, which equals 128. The graph of FIG. 5 shows an absolute value of observation values calculated under this assumption.

According to the results of the graph, timing acquisition can be achieved in the OFDM-based communication system.

Figure 6:
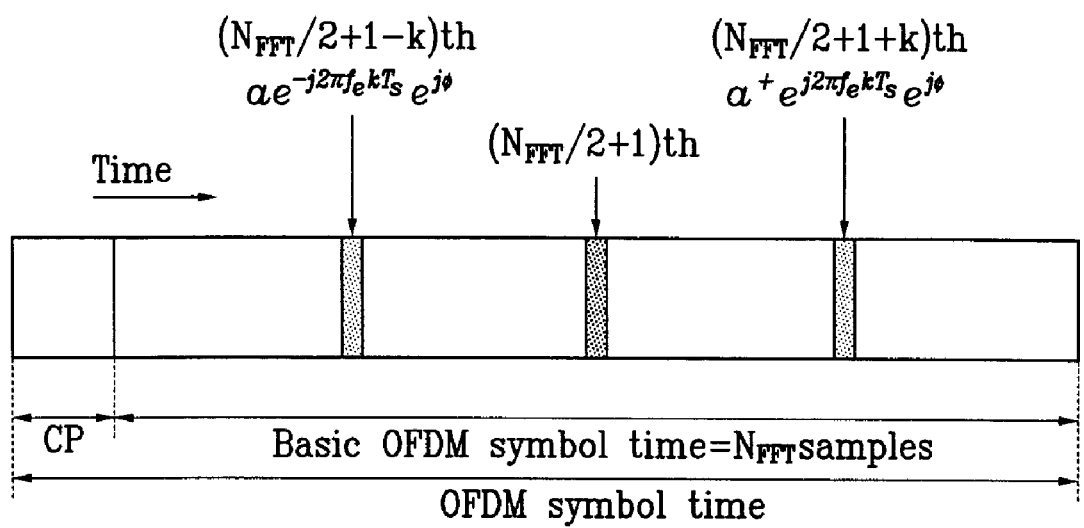
FIG. 6 shows a conjugate complex symmetric OFDM symbol in the time domain in the case of the presence of a carrier frequency error.

FIG. 6 shows a conjugate complex symmetric OFDM symbol in the time domain with the presence of a carrier frequency offset.

When a carrier frequency offset exists, a conjugate complex symmetric OFDM symbol is configured as shown in FIG. 6. Similar to FIG. 3, centering on the ($N_{FFT}/2+1$)-th OFDM symbol, the ($N_{FFT}/2+1-k$)-th OFDM symbol and the ($N_{FFT}/2+1+k$)-th OFDM symbol form a sample pair. In this case, a phase rotation angle θ in multiplication of two samples of the sample pair is linearly increased as the two samples are located farther from each other with reference to the ($N_{FFT}/2+1$)-th OFDM symbol.

Herein, in the case that an OFDM symbol preceding the ($N_{FFT}/2+1$)-th OFDM symbol by k (where k=1, 2, 3, . . . , $N_{FFT}/2-1$) is $a*e^{-j2\pi f_e kT_s}e^{j\theta}$, the k-th OFDM symbol from the ($N_{FFT}/2+1$)-th OFDM symbol is $a*e^{-j2\pi f_e kT_s}e^{j\theta}$. A phase value of the ($N_{FFT}/2+1$)-th OFDM symbol that is a reference point of conjugate complex symmetry can be obtained by multiplying $ae^{-j2\pi f_e kT_s}e^{j\theta}$ and $a*e^{j2\pi f_e kT_s}e^{j\theta}$.

A result of the multiplication is $aa*e^{j2\theta}$, and accordingly, the phase value of the ($N_{FFT}/2+1$)-th OFDM symbol becomes 2θ. Herein, fe denotes a carrier frequency offset, and $T_s$ denotes the length of an OFDM sample period in the time domain.

Figure 7:
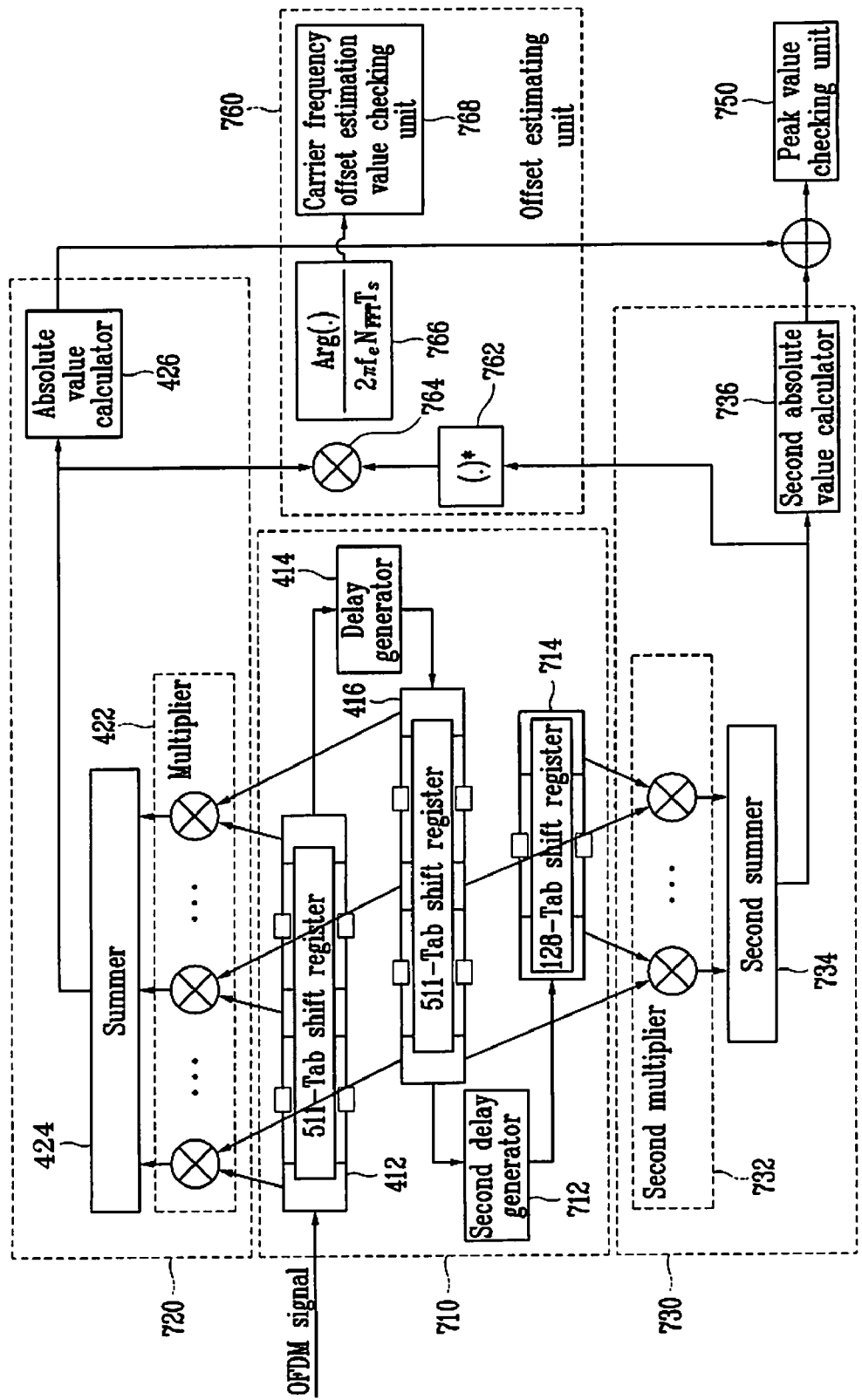
FIG. 7 is a block configuration of a timing acquisition and frequency offset estimation algorithm using an OFDM symbol with the presence of a carrier frequency offset according to the exemplary embodiment of the present invention.

FIG. 7 is a block diagram of a timing acquisition and frequency offset estimation algorithm using an OFDM symbol with the presence of a carrier frequency offset according to an exemplary embodiment of the present invention.

The timing acquisition and frequency offset estimation algorithm of FIG. 7 includes the same constituent elements as those of the timing acquisition and frequency offset estimation algorithm of FIG. 4, and further includes a delay signal generator 710, a second operation unit 730 for operating the second OFDM symbol input to the second tab shift register 416 and an OFDM symbol (hereinafter, referred to as a "third OFDM symbol") input to the third tab shift register 418, an adder 740, and an offset estimator 760. The delay signal generator 710 further includes a delay generator 712 and a tab shift register 714 (hereinafter, referred to as "a third tab shift register") in addition to the constituent elements of the delay signal generator 410 of FIG. 4.

In the present embodiment, the timing acquisition and frequency offset estimation algorithm of FIG. 7 is applied to a mobile communication system that uses 1024 subcarriers. Therefore, the first tab shift register 412 and the second tab shift register 416 are implemented by a 511-tab shift register according to $N_{FFT}/2-1$.

The second delay generator 712 generates a third OFDM symbol by delaying OFDM symbols input to the respective tabs of the second tab shift register 416 and transmits the third OFDM symbol to the third tab shift register 714.

In this case, the third tab shift register 714 can be implemented by a tab shift register that is smaller than the first tab shift register 412 or the second tab shift register 416. This is because not all symbol values for OFDM symbols are required and a few errors are tolerable when calculating the auto-correlation by using the second and third tab registers 416 and 714, and accordingly, a small tab shift register is used for prompt calculation of the auto-correlation and simplicity in configuration of the tab shift register.

Although the third tab shift register 714 of FIG. 7 is implemented by a 128-tab shift register for realizing the timing acquisition and frequency offset estimation algorithm according to the embodiment of the present invention, it can be implemented by the 511-tab shift register like the first tab shift register 412 or the second tab shift register 416.

The third tab shift register 714 receives OFDM symbols that have been delivered from the second delay generator 712 and stored in the second tab shift register 416, and stores the received OFDM symbols to the respective tabs.

The second operation unit 730 includes a multiplier 732, an adder 734, and an absolute value calculator 736. In the following description, the delay generator 712, the multiplier 732, the adder 734, and the absolute value calculator 736 are respectively referred to as a second delay generator, a second multiplier, a second adder, and a second absolute value calculator in order to distinguish the constituent elements of the timing acquisition and frequency offset algorithm of FIG. 4.

The second multiplier 732 multiplies the second OFDM symbol of the second tab shift register 416 and the third OFDM symbol of the third tab shift register 714 for obtaining second auto-correlation. Herein, the third OFDM symbol is delayed by the repeating pattern length. It is preferred that the number of multipliers included in the second multiplier 530 corresponds to the number of tabs of the third tab shift register 714.

The second adder 734 performs a sliding-sum on the second auto-correlation computed by the second multiplier 732 and outputs a second observation value. When the second observation value is output through the second adder 734, the second absolute value calculator 736 calculates an absolute value of the second observation value.

The adder 740 adds the absolute value of the observation value (hereinafter, referred to as a "first observation value") obtained by the first tab shift register 412 and the second tab shift register 414 and the absolute value of the observation value (hereinafter, referred to as a "second observation value") obtained by the second adder 734 and delivers the addition result to the peak value checking unit 750, and the peak value checking unit 750 checks a peak point of the sum of the absolute values of the first and second observation values. At this time, the peak point checked by the peak value checking unit 750 corresponds to end timing of the corresponding received OFDM symbol periods.

The offset estimator 760 estimates an offset when the timing acquisition process is completed.

Assuming that a carrier frequency offset exists and inter-symbol interference does not exist, all sample pairs with reference to the first OFDM symbol of an OFDM symbol period become conjugate complex symmetric and experience the same phase rotation. In this case, the phase rotation angle is less than that of FIG. 6 by $\pi f_e N_{FFT} T_s$.

Accordingly, the second observation value has a linear characteristic with respect to a carrier frequency offset in an interval of +/−½ frequency difference between subcarriers, and therefore frequency correction can be performed with a frequency value that corresponds to an integer times a frequency difference between subcarriers, wherein the frequency difference is a value that is closest to an initial carrier frequency offset. Therefore, after performing frequency correction first, offset correction is performed with an integer times frequency of a frequency difference between subcarriers by pattern matching in the frequency domain.

For this purpose, the offset estimator 760 includes a conjugate complex sample generator 762 for generating conjugate complex samples of the second observation value output from the second adder 734.

The second observation value processed through the conjugate complex sample generator 762 and the observation value output from the adder 424 are multiplied by the multiplier 764 of the offset estimator 760. A resulting value of the multiplication is processed through the offset estimator 766 by using a formula $$\frac{\text{Arg}(\cdot)}{2\pi f_\theta N_{FFT} T_s}$$

for obtaining a phase difference. When the phase difference is calculated by the offset estimator 766, a carrier frequency offset is estimated by the frequency offset estimate checking unit 768.

Figure 8:
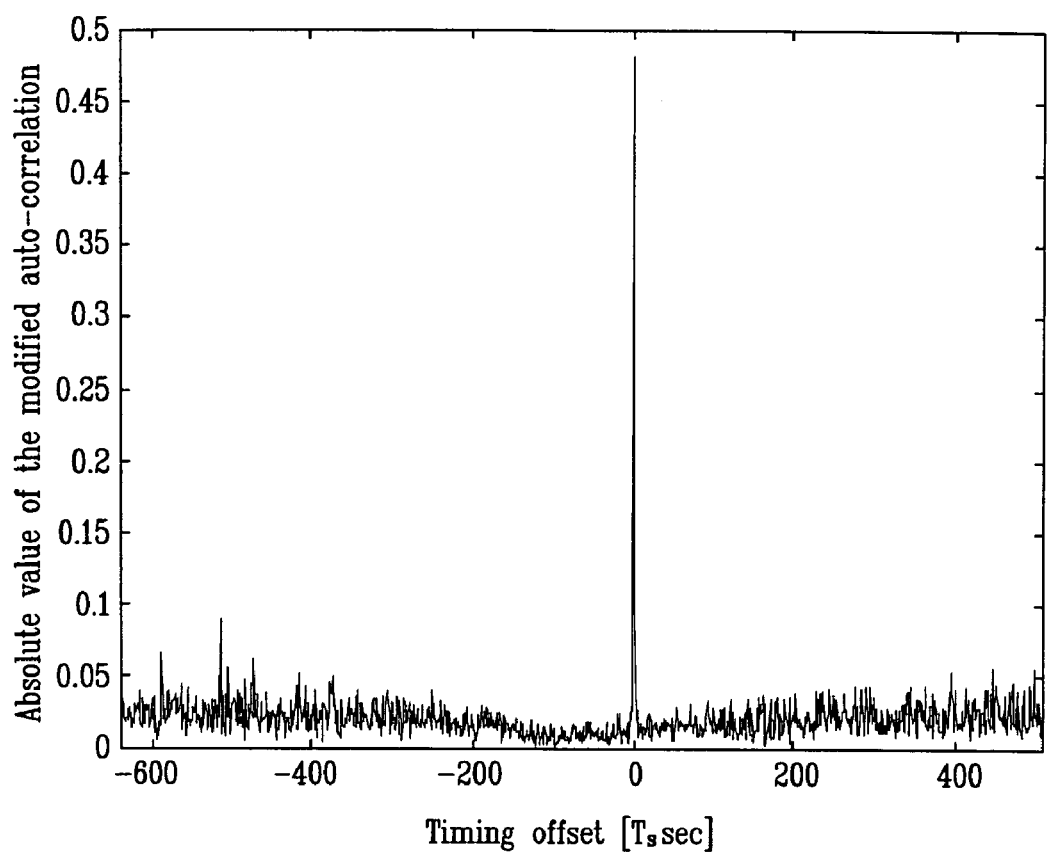
FIG. 8 is an exemplary graph showing characteristics of an absolute value of an observation value calculated through the timing acquisition and frequency offset estimation algorithm according to the exemplary embodiment of the present invention.

FIG. 8 is an exemplary graph that shows characteristics of an absolute value output through the timing acquisition and frequency offset estimation algorithm according to the exemplary embodiment of the present invention.

The peak value checking unit 750 checks whether a peak point of a sum of the absolute value of the first observation value and the absolute value of the second observation value output from the adder 740 is end timing of the corresponding received OFDM symbol period.

As in FIG. 5, assume that an additive white Gaussian noise (AWGN) channel is used, 400 subcarriers at left and right portions among 1024 subcarriers, excluding subcarriers that correspond to a main frequency among the 1024 subcarriers, are used for signal transmission, and the length of a cyclic prefix (CP) corresponds to ⅛ of an OFDM symbol length, which equals 128. Then, the peak value checking unit 750 checks results shown in the graph of FIG. 8.

According to the results, timing acquisition in the OFDM-based communication system can be achieved when the carrier frequency offset exists.

Figure 9:
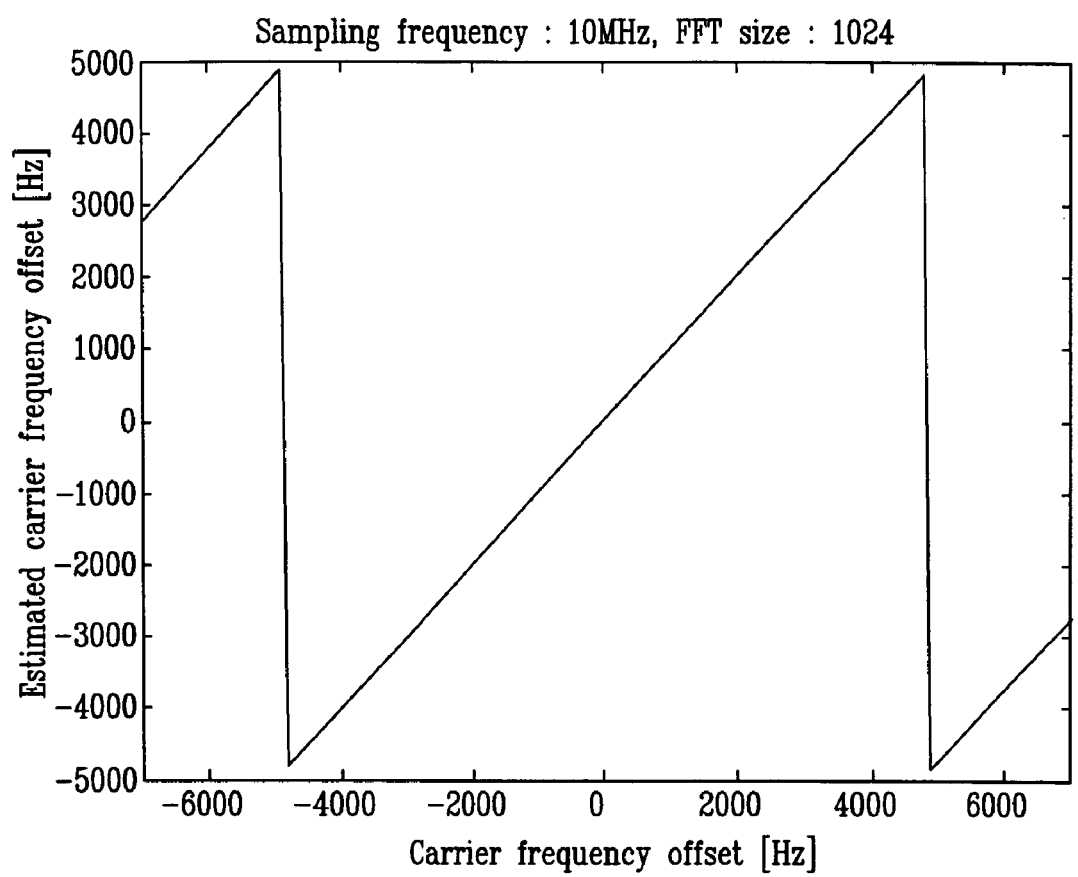
FIG. 9 is an exemplary graph showing characteristics of offset estimation calculated through the timing acquisition and frequency offset estimation algorithm according to the exemplary embodiment of the present invention.

FIG. 9 is an exemplary graph showing frequency offset estimation characteristics of the timing acquisition and frequency offset estimation algorithm according to the exemplary embodiment of the present invention.

When the timing acquisition is achieved, the carrier frequency offset estimation value checking unit 588 checks offset estimation characteristics as in FIG. 8. The graph of FIG. 9 shows frequency offset estimation characteristics in the case that a sampling frequency is 10 MHz.

As described, the timing acquisition and frequency offset estimation can be achieved by using the timing acquisition and frequency offset estimation algorithm of FIG. 7.

Herein, one of the algorithms of FIG. 4 and FIG. 7 is used or a combination of the two algorithms is used when performing timing acquisition and frequency offset estimation in a CP period, since there may exist signal components of an OFDM symbol as well as an inter-symbol interference due to the multi-path channel environment in the CP period.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

With the above-described configuration, timing acquisition with high reliability can be achieved since an increased number of OFDM symbols that can be used for timing acquisition are provided, and frequency offset estimation with high reliability can be achieved since the frequency offset estimation algorithm has lower implementation complexity and superior performance compared to the conventional algorithm.

In addition, preambles are designed under a limited condition for timing acquisition and carrier frequency offset estimation such that the preamble has a repeating pattern in the time domain. However, design freedom is obtained in accordance with the embodiments of the present invention, and therefore a variety of preamble structures are expected in design of the preamble.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A timing acquisition apparatus that calculates frame timing by using an orthogonal frequency division multiplexing (OFDM) symbol input to a terminal of an OFDM system, the timing acquisition apparatus comprising:
    a delay signal generator, comprising:
        a first tab shift register for storing the input OFDM symbol;
        a delay generator for delaying the input OFDM symbol from the first tab shift register by a length of a repeating pattern of input the OFDM symbol to generate a second OFDM symbol, wherein the input OFDM symbol and the second OFDM symbol are conjugate complex symmetric; and
        a second tab shift register for storing the second OFDM symbol;
    an operation unit for calculating an observation value resulting from auto-correlation of the input OFDM symbol from the first tab shift register and the second OFDM symbol from the second tab shift register; and
    a peak value checking device for calculating the frame timing by checking a peak point of an absolute value of the observation value.

2. The timing acquisition apparatus of claim 1, wherein the first tab shift register and the second tab shift register shift the stored input OFDM symbol and the stored second OFDM symbol by one tab when an OFDM symbol and a second OFDM symbol are input.

3. The timing acquisition apparatus of claim 1, further comprising:
    a second delay generator for generating a third OFDM symbol by delaying the second OFDM symbol; and
    a third tab shift register for storing the third OFDM symbol.

4. The timing acquisition apparatus of claim 3, further comprising:
    a second operation unit for calculating a second observation value resulting from second auto-correlation of the second OFDM symbol and the third OFDM symbol; and
    an adder for adding an absolute value of the observation and an absolute value of the second observation value.

5. The timing acquisition apparatus of claim 4, wherein the peak value checking device calculates the frame timing of a peak point of a sum of the absolute values of the observation value and the second observation value, the sum being output from the adder.

6. The timing acquisition apparatus of claim 1, wherein the operation unit comprises:
    a multiplier for calculating the auto-correlation by multiplying the input OFDM symbol from the first tab shift register and the second OFDM symbol from the second tab shift register;
    an adder for calculating the observation value by performing a sliding sum on the auto-correlation; and
    an absolute value calculator for calculating the absolute value of the observation value.

7. The timing acquisition apparatus of claim 1, wherein when centering on a $(N_{FFT}/2+1)$-th OFDM symbol, the input OFDM symbol is a $(N_{FFT}/2+1-k)$-th OFDM symbol and the second OFDM symbol is a $(N_{FFT}/2+1+k)$-th OFDM symbol to form a sampling pair,
    wherein $N_{FFT}$ denotes a size of an input or output vector used for generating an OFDM symbol, and k denotes a constant number that is less than $N_{FFT}/2$.

8. A method for calculating frame timing by using an orthogonal frequency division multiplexing (OFDM) symbol input to a terminal of an OFDM system, the method comprising:

(a) receiving, at the terminal, at least one OFDM symbol from a base station, and storing the at least one OFDM symbol in a first tab shift register;

(b) generating, by a delay signal generating unit, a second OFDM symbol by delaying the at least one received OFDM symbol from the first tab shift register by a length of a repeating pattern of the at least one received OFDM symbol, wherein the delay signal generating unit stores the at least one received OFDM symbol in the first tab shift register and stores the second OFDM symbol in a second tab shift register, and wherein the at least one received OFDM symbol and the second OFDM symbol are conjugate complex symmetric;

(c) calculating, by an operation unit, at least one auto-correlation by operating the at least one received OFDM symbol from the first tab shift register and the second OFDM symbol from the second tab shift register; and (d) outputting, from an absolute value calculator, a peak point of an absolute value of an observation value resulting from the at least one auto-correlation as the frame timing.

9. The method of claim 8, further comprising, between (c) and (d):

generating a third OFDM symbol by delaying the second OFDM symbol; and calculating at least one second auto-correlation by operating the second OFDM symbol and the third OFDM symbol.

10. The method of claim 9, wherein in (d), a peak value of a sum of the absolute value of the observation value resulting from the at least one auto-correlation and an absolute value of a second observation value resulting from the at least one second auto-correlation are checked and output as the frame timing.

11. The method of claim 8, wherein in (c), the at least one auto-correlation is calculated by multiplying the at least one received OFDM symbol and the second OFDM symbol.

12. The method of claim 8, wherein in (d), the observation value is calculated by performing a sliding sum on the at least one auto-correlation.

13. The method of claim 8, wherein when centering on a $(N_{FFT}/2+1)$-th OFDM symbol, the at least one received OFDM symbol is a $(N_{FFT}/2+1-k)$-th OFDM symbol and the second OFDM symbol is a $(N_{FFT}/2+1+k)$-th OFDM symbol to form a sampling pair, wherein $N_{FFT}$ denotes a size of an input or output vector used for generating an OFDM symbol, and k denotes a constant number that is less than $N_{FFT}/2$.

* * * * *